United States Patent Office
2,893,903
Patented July 7, 1959

2,893,903

METHOD OF BRAZING

Donald E. Wernz, Baltimore County, and Melvin M. Schwartz, Baltimore, Md., assignors to The Martin Company, Middle River, Md., a corporation of Maryland No Drawing. Application June 24, 1955
Serial No. 517,922

4 Claims. (Cl. 148—26)

This invention relates to improved methods of brazing aluminum and aluminum base alloys and to certain improved brazing pastes for that purpose. The term "aluminum" when used herein and in the appended claims to describe a part to be joined or brazed is defined as including not only aluminum but also alloys containing about 70 percent or more, by weight of that metal.

The brazing of aluminum has but recently been practiced extensively. Although the brazing of that metal may be performed in many detailed ways, the present invention is directed only to those brazing processes in which the parts to be joined are assembled in the relationship to be established by the joining operation, a paste comprising a mixture of powder filler metal and fluoride salt is then placed at or near the proposed line or point of juncture and the assembly is heated to melt the filler, or brazing metal, so that it lies in molten condition at said point or line of juncture and will, on later solidification, form the desired union or connection between the assembled parts. The parts to be joined may all be made of aluminum or one or more may be made of other metal. So long as aluminum is to be joined to aluminum or to other metal the present invention has useful aspects. The temperature of brazing must, of course, lie below the melting point of the metallic articles which are to be joined.

The crux of such a brazing operation lies in the melting and coalescence of the metal particles in the brazing paste into a molten metal mass free of oxide, and in the contact of this mass with clean surfaces of the metal to be joined during the brazing step. This process is static in the sense that after the paste has been placed in its proper place near the point or line of proposed juncture of the metal parts, no physical disturbance of the body of the paste takes place except that induced by the later application of heat. Therefore, another essential element of the paste—the fluoride salt—must not only function to automatically clean the metal surfaces to be joined and the surfaces of the particles of the filler, or joining metal, but it must also first promote the coalescence of the many particles of powder filler metal in the paste as they melt under the applied heat. Another essential component of the paste is the vehicle and this consists of a liquid which has as its primary function the forming of the particles of metal powder and fluoride salt into a paste of desired consistency. Therefore, the vehicle is, in a broad sense, a physical instrumentality designed to carry or bring to the operation the joint forming constituents of the paste and to preliminarily maintain those constituents in compact form at the site of the operation and to thereafter, as heat is applied, disappear without leaving behind objectionable matter such as large amounts of carbon.

The present invention has as an object the provision of an improved aluminum brazing process in which the mixture of fluoride salt and powder filler or joining metal is brought to the operation in particular vehicles performing, without deleterious effects, the functions above outlined. A further object of the invention is the provision of new and improved brazing pastes particularly adapted to the brazing of aluminum and titanium. A still further object is a new and improved paste characterized by improved flowing properties of the metallic constituents at the brazing temperature, and the provision of methods for making such a paste.

It is accordingly an object of the present invention to provide an improved method of joining metal parts by brazing wherein at least one of the parts to be joined is aluminum or an alloy of aluminum containing at least about 70% by weight of aluminum. Essentially, the method is carried out utilizing as the brazing composition a mixture of a metal fluoride salt and powdered filler metal consisting of an aluminum base alloy with the ingredients being in the form of a paste by virtue of the presence of an inorganic vehicle. It has been noted that the brazing composition of the present invention is characterized by an increased fluidity of brazed metal as compared with conventional aluminum brazing sheets and rods.

Other and further objects of the present invention will become readily apparent from the following detailed description of the present invention.

The brazing of aluminum normally requires the use of an aluminum base alloy as the brazing or filler metal. This alloy must, as is known, melt at a temperature lower than the melting temperature of the aluminum body to be joined in order that during the brazing operation only the joining or powder filler metal will be melted and the parts to be joined will retain their solidity against the degree of heat required to effect that result. The aluminum alloy used as the filler may thus be selected from those alloys which have a lower melting point than the aluminum bodies being joined. The selection is, therefore, somewhat restricted according to whether the aluminum body to be joined has a high melting point (example, pure aluminum), or a lower melting point such as is possessed by aluminum base alloys. Alloys which are used as powder filler metal include aluminum-silicon alloys with or without minor additions of other alloying elements which tend to further lower the melting point thereof, such as zinc, cadmium or tin, etc.; aluminum-copper alloys; aluminum-copper-zinc alloys; aluminum-zinc alloys or other aluminum alloys all with or without the addition of other elements to effect lowering of the melting point or to produce other effects. The selection of the filler alloy may also be governed by considerations other than melting point, such as corrodibility, strength, etc., all of which are dictated by the use to which the brazed article is to be put. The selection of a particular powder filler metal or alloy is, however, a part of this invention. To avoid the presence of an oxide on the aluminum surfaces being joined there is required, for the successful joining of aluminum, the use of fluxes composed principally of metal fluorides. For the purposes of the description of this invention and the claims directed thereto the fluxes will be identified and defined as "metal fluoride salts." The metal fluoride salt used should, of course, be molten at the temperature of brazing.

The proportion of aluminum fluoride salt to filler powder best used in the brazing operation may vary slightly. It has been found that mixtures of 1 part by weight of salt to 7 parts by weight of powdered metal give the most consistent results, but mixtures of from about 4 to about 12 parts by weight of powdered metal to 1 part by weight of salt can be used. The salt should be in powdered form to promote uniform mixture and good paste formation. The powdered filler should be in the form of discrete particles and best results are obtained with particles having a size to pass through a 100 mesh screen and be retained on a 150 mesh screen. The salt and powdered metal filler are thoroughly mixed together to form the brazing mixture.

There is described in the foregoing in general terms the composition of the brazing composition utilized in the practice of the present invention. In the above, it is mentioned that the two basic ingredients, the flux and the powdered metal, are uniformly mixed together as a paste. In order to control the consistency of the paste and its production, it is preferred that an inorganic vehicle which will evaporate without any trace of residue be utilized. For the purposes of the present invention, it is preferred that the inorganic vehicle be water.

The preferred proportions of the brazing composition are about 7 grams of an aluminum powder filler, one gram of aluminum-fluoride, and sufficient water to make a workable paste which is about 3½ grams of water. The ingredients are mixed together and form a workable paste which can be handled quite easily. To use the paste, it is simply necessary to brush it onto the joint that is to be brazed and thereafter any conventional brazing technique can be employed, as for example, a furnace brazing technique. The method of the present invention has special application when using a dip brazing technique. The result is a small smooth brazed fillet having desirable structural characteristics and in this respect the method of the present invention has advantages over the use of solid filler materials which must be cut and preformed before being used.

As a further preferred illustration of the present invention the following should be considered. A paste is prepared using a powdered aluminum-silicon alloy consisting essentially of about 88% by weight of aluminum and about 12% by weight of silicon and a flux composed of $AlF_3$. The paste is prepared using from about 4 to about 12 parts by weight of the powdered alloy and about 1 part by weight of the flux. The preferred range of the ingredients is from about 6 to about 9 by weight of alloy to about 1 part by weight of flux. The optimum proportions are 7 to 8 parts of alloy to 1 part of flux. The alloy itself consists essentially of about 7 parts by weight of aluminum to about 1 part by weight of silicon. The proportion of aluminum may be increased to about 12 parts by weight to 1 part of silicon. This is easily accomplished by adding to the original powdered alloy other powdered alloys containing a major proportion of aluminum and minor amounts of copper, magnesium, manganese, etc. The above ingredients are mixed with water to form a workable paste. Although the precise amount of water which may be added can vary within limits depending upon what is considered a workable paste, it has been found that roughly 3½ parts by weight of water will give a sufficiently workable paste.

Although the method of the present invention produces a joint having strength characteristics about double over that obtained using a conventional solid filler, the mechanical properties of the brazed joint can be even further increased by using one of the aluminum-magnesium-copper bearing alloys.

Through metallurgical examinations, the powder filler paste shows substantially less flux entrapment than is obtained by using conventional sheet or rod fillers. In addition, there is a substantial reduction in the pre-brazed preparation time due to the simple application techniques incident to the use of the powdered filler paste of the present invention. Thus, it is evident that the necessity for cutting and preforming solid filler materials such as sheets or rods has been eliminated. Further, a superior filleting of joints has been noted in conjunction with the practice of the present invention and also the porosity characteristics of the joints are greatly reduced. By the practice of the present invention, tests reveal that the mechanical properties of the joints are consistently better than joints prepared by conventional practices in this art. Further closer tolerance fits on all brazed assemblies are possible. As an example, standard sheet metal tolerances (+ or −.062) have been successfully brazed with the powdered filler paste according to the present invention.

The vehicle used to place the metal (Al) fluoride salt-powdered metal filler mixture in paste form and to thus carry it to the operation should be aqueous and should volatilize or otherwise leave the paste in the pre-heating furnace operating at 1000° F.

Although the present invention has been shown and described in conjunction with a preferred embodiment, nevertheless, various changes and modifications obvious to one skilled in the art are within the spirit, scope and contemplation of the invention.

What is claimed is:

1. In the method of joining metal parts by brazing where at least one of the parts to be joined is a metal containing at least 70% by weight of aluminum, which comprises the steps of mixing 1 part by weight of a chloride-free fluxing agent in particulate form and consisting essentially of aluminum fluoride with approximately 4 to 12 parts by weight of an aluminum base alloy consisting essentially of about 88% by weight of aluminum and about 12% by weight of silicon, in the presence of sufficient aqueous vehicle to form a paste, applying the paste near the line of proposed juncture of the metal parts, and bringing the metal parts to the brazing temperature in the presence of a fluxing agent to effect the brazing operation.

2. A brazing paste consisting essentially of 1 part by weight of a chloride-free fluxing agent principally containing aluminum fluoride, from approximately 4 to 12 parts by weight of a powdered filler of an aluminum base alloy consisting essentially of about 88% by weight of aluminum and about 12% by weight of silicon, and sufficient aqueous vehicle to form a workable paste.

3. A brazing paste consisting essentially of a mixture of approximately (1) 1 part by weight of substantially chloride-free particulate aluminum fluoride, (2) from about 4 to 12 parts by weight of powdered aluminum-silicon base alloy, and (3) sufficient aqueous vehicle to make a workable paste, said aluminum-silicon base alloy comprising approximately by weight of about 1 part silicon and from about 7 to 12 parts aluminum, with incidental impurities.

4. A brazing paste for joining metal bodies, at least one of which contains at least 70% by weight of aluminum consisting essentially of a mixture of approximately (1) 1 part by weight of substantially chloride-free particulate aluminum fluoride, (2) from about 4 to 12 parts by weight of powdered aluminum-silicon base alloy filler metal and (3) sufficient aqueous vehicle to make a workable paste, said aluminum-silicon base alloy having a melting temperature lower than the bodies to be joined in order that during the brazing operation only the powdered filler metal will be melted and the bodies to be joined will retain their solidity against the degree of heat required to effect brazing.

References Cited in the file of this patent

UNITED STATES PATENTS

| | | |
|---|---|---|
| 1,748,785 | Miller | Feb. 25, 1930 |
| 2,299,168 | Miller | Oct. 20, 1942 |
| 2,403,110 | Miller | July 2, 1946 |
| 2,464,925 | Fox | Mar. 22, 1949 |
| 2,552,105 | Miller | May 8, 1951 |
| 2,594,313 | Klinker | Apr. 29, 1952 |
| 2,658,013 | Hannahs | Nov. 3, 1953 |
| 2,731,362 | Brondyke | Jan. 17, 1956 |

FOREIGN PATENTS

| | | |
|---|---|---|
| 489,569 | Canada | Jan. 13, 1953 |